United States Patent [19]

Olsson

[11] Patent Number: 5,343,411
[45] Date of Patent: Aug. 30, 1994

[54] ACCELEROMETER ARRANGEMENT
[75] Inventor: Jan Olsson, Partille, Sweden
[73] Assignee: General Engineering (Netherlands) B.V., Utrecht, Netherlands
[21] Appl. No.: 778,136
[22] PCT Filed: Mar. 6, 1991
[86] PCT No.: PCT/SE91/00171
  § 371 Date: Dec. 13, 1991
  § 102(e) Date: Dec. 13, 1991
[87] PCT Pub. No.: WO91/13784
  PCT Pub. Date: Sep. 19, 1991
[30] Foreign Application Priority Data
  Mar. 8, 1990 [GB] United Kingdom ................. 9005168
[51] Int. Cl.5 .............................................. G01P 15/02
[52] U.S. Cl. ..................................... 364/566; 324/162
[58] Field of Search ................ 324/162; 364/566, 565, 364/575, 550

[56] References Cited
U.S. PATENT DOCUMENTS

| | | | |
|---|---|---|---|
| 3,762,495 | 10/1973 | Usui et al. ........................ | 324/162 |
| 3,851,305 | 11/1974 | Baba et al. ........................ | 340/52 |
| 3,902,763 | 9/1975 | Takeuchi .............................. | 303/21 |
| 4,021,057 | 5/1977 | Held et al. ......................... | 280/735 |
| 4,243,248 | 6/1981 | Scholz et al. ..................... | 280/735 |
| 4,497,025 | 1/1985 | Hannoyer ............................ | 364/424 |
| 4,630,508 | 12/1986 | Klatt ...................................... | 74/866 |
| 4,638,179 | 1/1987 | Mattes et al. ..................... | 307/10 |
| 4,669,045 | 5/1987 | Kubo ................................... | 364/566 |
| 4,670,852 | 6/1987 | Masaki et al. .................... | 364/566 |
| 4,745,564 | 5/1988 | Tennes et al. .................... | 364/566 |
| 4,879,672 | 11/1989 | Pombrio, Jr. ..................... | 364/566 |

FOREIGN PATENT DOCUMENTS

| | | |
|---|---|---|
| 0156930 | 9/1985 | European Pat. Off. . |
| 2134294 | 6/1972 | Fed. Rep. of Germany . |
| 2222038 | 11/1973 | Fed. Rep. of Germany . |
| 3001780 | 7/1981 | Fed. Rep. of Germany . |
| 1388636 | 3/1975 | United Kingdom . |

Primary Examiner—Jack B. Harvey
Assistant Examiner—Thomas Peeso
Attorney, Agent, or Firm—Spencer, Frank & Schneider

[57] ABSTRACT

An accelerometer arrangement includes an accelerometer for producing a signal representative of the acceleration or deceleration of a vehicle and processing circuitry for processing the signal from the accelerometer by either integrating or differentiating to produce a processed signal, comparing the processed signal with at least one reference signal, and providing an output signal when the reference signal is exceeded by the processed signal. At least one of the reference signal and the processing of the signal vary in a predetermined manner with time.

17 Claims, 6 Drawing Sheets $T_F$ = TRIGGING TIME

ACCELEROMETER ARRANGEMENT

BACKGROUND OF THE INVENTION

1. Field of the Invention

The present invention relates to an accelerometer arrangement and more particularly relates to an accelerometer arrangement for use in a motor vehicle.

2. Background Information

An accelerometer may be used in a motor vehicle to measure the deceleration of the motor vehicle. Such an accelerometer may be utilized to trigger a safety device, such as an inflatable air bag, when the deceleration detected by the accelerometer corresponds to accident conditions.

It is important that an air bag is inflated at the correct instant. The reason for this is that an air bag takes a certain period of time to become fully inflated, but once it has inflated it then starts to deflate. It is therefore important that when a person travelling in a motor vehicle is thrown forwardly, in an accident, the air bag should be fully inflated just before the person is thrown forwardly.

It is found that the deceleration curves for a motor vehicle involved in an accident depend very much upon the relative speed of impact. Of course, the rate of forward travel of a person towards an air bag provided in a vehicle also depends upon the speed of the vehicle before the initial impact of the accident, and the actual position of the person (i.e. whether they are leaning forwards, or sitting back) can have an effect.

SUMMARY OF THE INVENTION

Of course, the deceleration curve of any particular vehicle is unique to that design of vehicle, depending upon many factors, including the characteristics of the so-called "crumple zone" which is now usually built into the front part of a motor car. This part of the motor car is designed to crumple during an accident to provide a relatively smooth deceleration of the passenger-containing part of the vehicle.

There is thus a requirement for an accelerometer which is able to provide an output signal to trigger an item such as an air bag in response to deceleration of the vehicle, the signal being provided at the appropriate time depending upon the nature of the deceleration of the vehicle.

The present invention seeks to provide an improved accelerometer arrangement.

According to this invention there is provided an accelerometer arrangement, said arrangement comprising an accelerometer adapted to provide signals representative of the acceleration or deceleration of a vehicle, means being provided to process the signal by integrating or differentiating the signal and to compare the processed signal with a reference signal, there being means to provide an output when the reference signal is exceeded, the reference signal and/or the condition of processing the signal not being constant by varying, in a substantially predetermined manner with time. In preferred embodiments the variation in the reference signal and/or the condition of processing are varied so as to distinguish between a real accident where a dangerous situation arises, and a slight knock.

Preferably the means to provide an output signal are only activated when the signal representative of acceleration or deceleration exceeds a predetermined threshold.

Conveniently the processed signal is compared with a reference signal, with the reference signal varying in a predetermined manner with time.

Preferably the signal is integrated about an adjustable integration level, the integration level being adjusted in a substantially predetermined manner with time.

Advantageously the reference signal comprises a signal derived from a memory, the memory passing appropriate values to the comparator at appropriate instants in time.

Preferably different integration level values are stored in a memory, the memory passing appropriate values to the integrator at appropriate instands in time.

Conveniently the memory contains a plurality of profiles, each appropriate to a predetermined parameter or parameters, means being provided to determine the parameter(s) and to pass a signal representative of the parameter(s) to the memory so that an appropriate profile is selected, each profile containing comparator reference signals and/or integration level values.

Preferably the signal from the accelerometer, when it exceeds a predetermined threshold, is processed, and the processed signal is compared with an initial reference level for a predetermined period of time and is then compared with a second reference level for another predetermined period of time.

Conveniently the integrated signal is subsequently compared with a further reference level during a further predetermined period of time.

After the first predetermined period of time the signal may be further processed before the subsequent comparison stage for the second period of time, and may also be further processed before any subsequent comparison step.

Preferably the signal is integrated about one level for a period of time, and then about another level for a succeeding period of time.

Conveniently the signal is integrated about another level for a further period of time.

According to another aspect of this invention, there is provided an accelerometer arrangement, said arrangement comprising an accelerometer adapted to provide signals representative of the acceleation or deceleration a vehicle and a threshold discriminator to determine when said signals exceed a threshold and to activate signal processing means, said signal processing means comprising inegrating means to integrate the signal about an integration level, and comparator means to compare the integrated signal with a reference level, to provide an output signal, memory means being provided containing different integration level values and/or comparator reference levels, timing means being provided to supply predetermined integration level values and/or comparator reference levels to the integrating means and/or the comparator means at predetermined times after the signal exceeds said threshold.

Preferably the output is connected to the triggering device for an air bag.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE PREFERRED EMBODIMENT(S)

Figure 1:
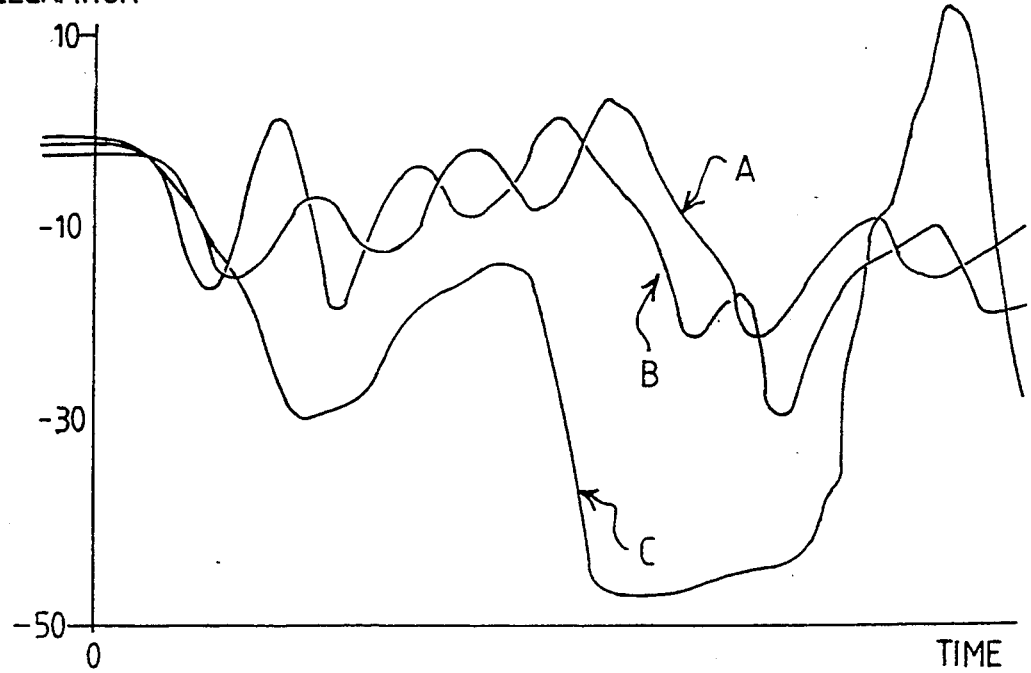
FIG. 1 is a graphical representation of three deceleration curves, in which acceleration is plotted against time, with the curves representing a motor vehicle crashing into a solid object at speeds of 25, 35 and 50 kilometers per hour.

Referring initially to FIG. 1 of the accompanying drawings, which is a graphical figure, it can be seen that three curves A, B and C are shown. The curve A represents the deceleration curve for a vehicle initially travelling at a speed of 25 kilometers per hour impinging upon a solid object, the curve B is the deceleration curve for a vehicle initially travelling at 35 kilometers per hour impinging on a solid object and th curve C is the deceleration curve for a vehicle initially travelling at 50 kilometers per hour impinging upon a solid object. It is to be appreciated that this set of deceleration curves relate to a specific design of vehicle, and each individual design of vehicle will have a different set of deceleration cures. It is, however, interesting to note that the individual deceleration curves of the set of curves for a particular design of vehicle may be of very different shape. Thus the nature of the deceleration of a vehicle is very dependant upon the initial speed of the impact.

It is to be appreciated that the air bag present in such a vehicle must be inflated, at an optimum instant, if the air bag is to perform in the best possible manner. It is important, for example, that the air bag is inflated at a relatively early stage in the case of the vehicle travelling at 50 kilometers per hour, and the bag must be inflated at a later stage in the case of the vehicle travelling at 35 kilometers per hour. In the case of a vehicle travelling at 25 kilometers per hour the bag should not inflate at all.

Figure 2:
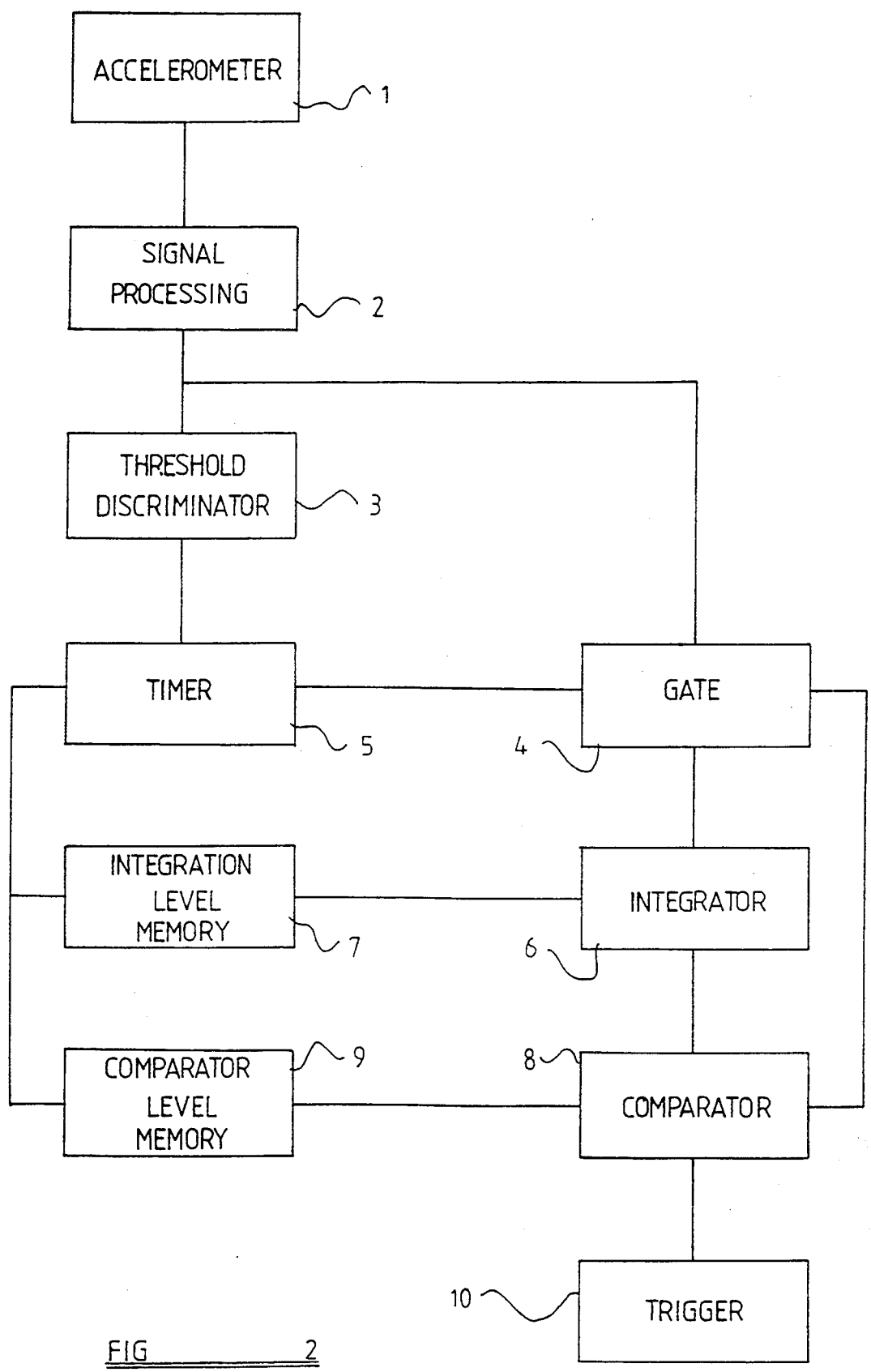
FIG. 2 is a block diagram of an accelerometer arrangement in accordance with the invention, somewhat simplified.

Referring now to FIG. 2, an accelerometer arrangement in accordance with the invention comprises an accelerometer 1 adapted to produce an output signal directly representative of the acceleration or deceleration of a vehicle in which the accelerometer is mounted. The accelerometer is connected to a signal processing circuit 2. The signal processing circuit 2 contains components which filter and limit the output signal from the accelerometer, and may also contain components which effect further procedures, such as an analogue to digital conversion. The output from the signal processing circuit is fed to a threshold discriminator 3 and is also fed to an output of a gate 4. The threshold discriminator 3 is adapted to provide an output when the signal from the signal processing circuit 2 exceeds a predetermined level and that output is fed to a timer 5. The signal activates the timer. The timer 5 has an output connected to a control input of the gate 4 and is thus adapted to open the gate in response to the output of the signal processing circuit 2 exceeding the threshold. When the gate 4 is opened, the signal from the signal processing circuit 2 is fed to an integrator 6. The integrator 6 is associated with an integration level memory 7 which contains at least one preset level about which the integrator 6 is to integrate the signal supplied to it through the gate 4. The integration level memory 7 may contain a plurality of levels about which the integrator is to integrate, the integrator using different integration levels at different times during an integration procedure. Thus the timer 5 is also connected to the integration level memory 6 so that the appropriate integration level is made available to the integrator 6 at the appropriate time. The output of the integrator 6 is fed to a comparator 8. The comparator 8 is also associated with a comparator level memory 9 which contains one or more values against which the output of the integrator 6 is to be compared. Again different comparator levels may be used at different times during the described integrating procedure and thus the comparator level memory 9 is connected to the timer 5 so that the appropriate comparator level may be made available to the comparator 8 at the appropriate time. One output of the comparator 8 is connected to the gate 4 and is adapted to close the gate 4 under certain circumstances as will become clear, and a further output of the comparator 8 is connected to a trigger 10 which is adapted to initiate the operation of a device such as an air bag.

It is to be appreciated that if the integration level memory 7 contains only one value the device will operate in a straightforward manner as will now be described with reference to FIG. 3.

Figure 3:
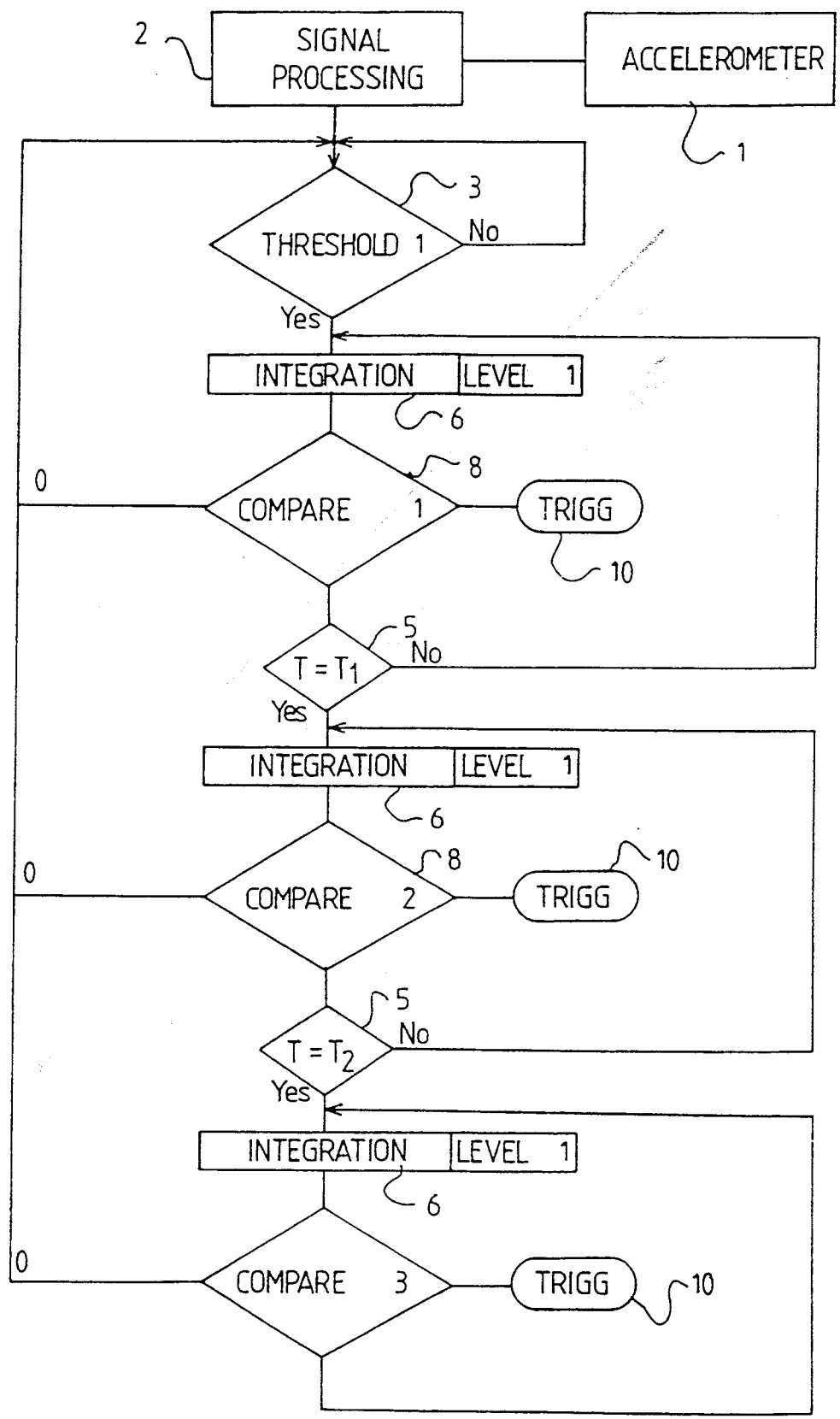
FIG. 3 is a flow diagram of the operation of the arrangement of FIG. 2.
Figure 5:
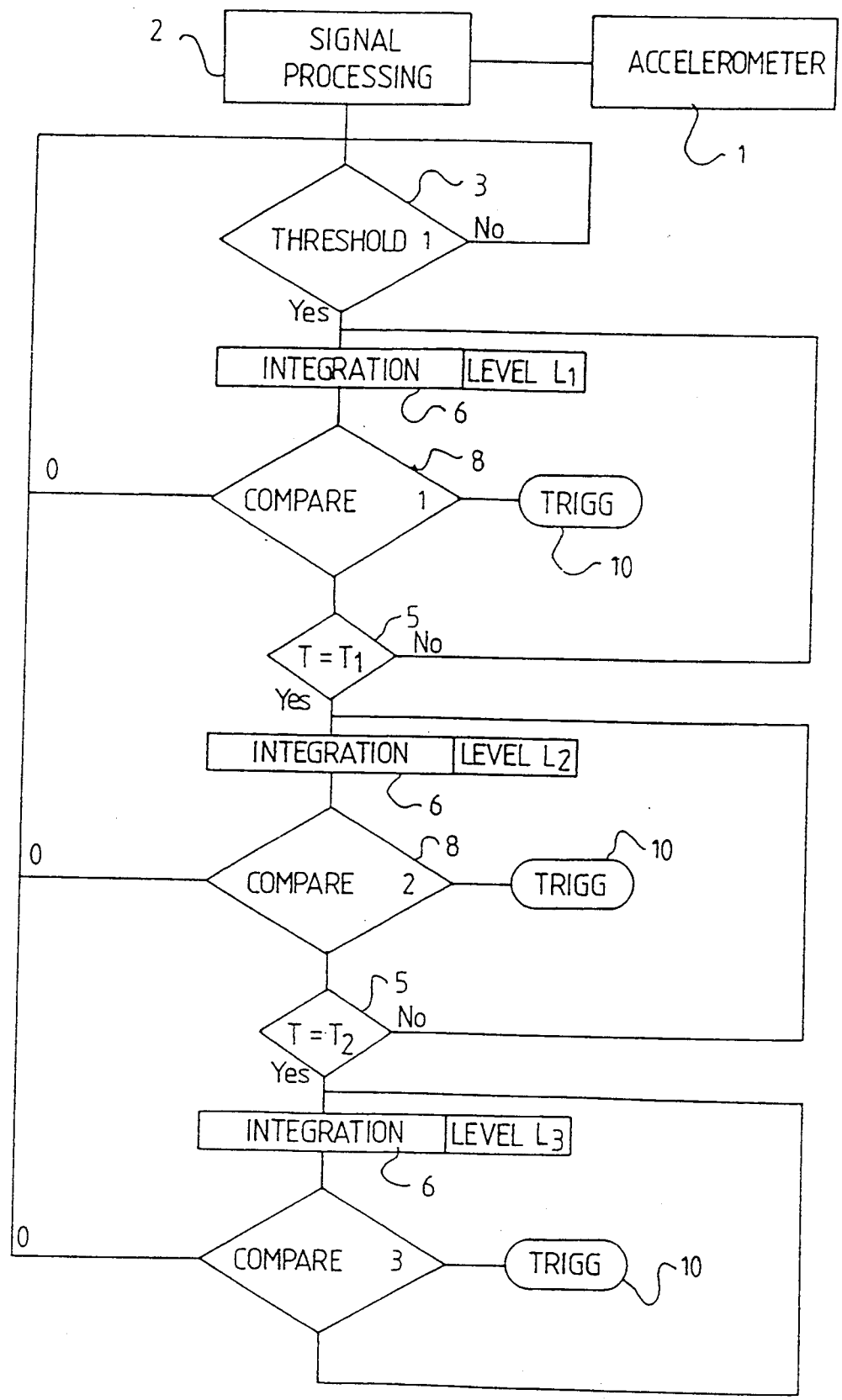
FIG. 5 is a flow diagram corresponding to FIG. 4 illustrating a modified embodiment of the invention.

Referring to FIG. 3, it is to be appreciated that the signal from the accelerometer is continually processed by the processing circuit 2. The output of the processing circuit 2 is passed to the threshold discriminator 3. If the threshold level set by the threshold discriminator is not exceeded, the integrating and comparison step is not initiated. However, if the threshold is exceeded, then integration commences.

The signal is integrated in the integrator about a predetermined level, signal in excess of the level being added to the integral, and signal beneath the level being subtracted. The level may be equal to the threshold level of the threshold device 3. The integrated signal is passed to the comparator 8 for a comparator step "Compare 1". The comparator 8 serves to determine whether the integrated signal, which is now representative of speed, is less than or greater than a predetermined reference value $X'1$ and also determines if the signal is nought. If the signal supplied from the integrator to the comparator 8 during the comparator step A is nought, then the comparator sends a signal which closes the gate 4 and the total process restarts. However, if the signal is greater than $X'1$ then the triggering arrangement 10 for the item such as an air bag is activated. If the signal is less than $X'1$ then, for a period of time up to a time T1, as determined by the timer 5 the integration by the integrator 6 and the comparing by the comparator 8 continues. However, once a period of time T1 is exceeded (and the reference value $X'1$ has not been exceeded) the integration about the said predetermined level continues and the integrated signal is then compared in the comparator 8 with second comparator level from the comparator level memory 9, as a comparator step "Compare 2". If the integral supplied to the comparator 8 during comparator step "Compare 2" is nought, the comparator 8 sends a signal which closes the gate 4 and the total process re-starts. The comparator step "Compare 2" compares the signal with a second predetermined reference value X'2. If the value of the signal is greater than X'2, then the triggering device 10 is activated. If it is less than X'2, then, for a period of time until the time T2, the integration and comparison of the comparator step "Compare 2" continue. Once the time T2 has been exceeded the signal is passed to a third comparator step "Compare 3" which operates to determine if the integrated signal is greater than or less than a third reference signal X'3 present in the comparator level memory. If the signal is greater than X'3 the triggering device 10 is activated, and if the integrated signal is nought, then the gate 4 is closed and the complete integration process re-commences. If the integrated signal is greater than nought but less than X'3 the integration and comparison procedure continues indefinitely.

Thus the condition of processing of the signal varies in a predetermined way with time.

Figure 4:
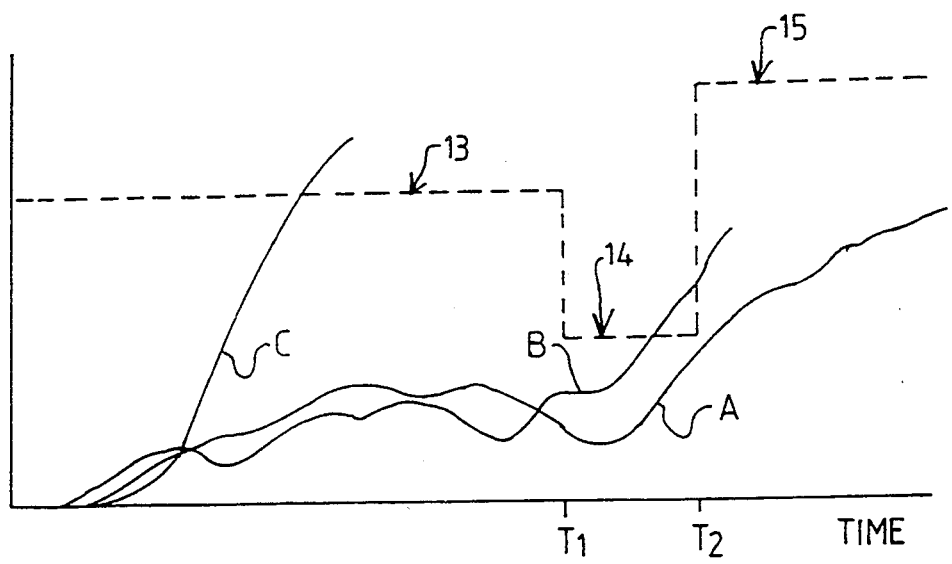
FIG. 4 is a graphical figure, for use in explaining the operation of the arrangement of FIG. 2.

Referring to FIG. 4, it is to be noted that the Figure is a graphical figure illustrating three curves A, B and C, which are the integrals corresponding to curves illustrated in FIG. 1.

Dealing initially with integrated curve C, it can be seen that the curve rises relatively swiftly. This is the curve representative of the relatively high speed crash, in which it is desirable to inflate the air bag at the earliest possible moment.

Present on FIG. 4 is a dotted line, the first part of which, 13, is at a level corresponding to the level X'1 used in the comparator step "Compare 1". It can be seen that the curve C passes this reference level and thus it will be appreciated that the comparator step "Compare 1" will serve to operate the triggering device 10 at a time when the integrated curve C passes the horizontal part of the dotted line 13.

At time T1 the first comparator step "Compare 1" is no longer operative, but the second comparator step "Compare 2" becomes operative. Thus the second part 14 of the dotted line represents the value X'2 as used in the comparator step "Compare 3". It can be seen that in this particular case, the level X'2 is less than the level X'1. It can be seen that the integrated curve B, representing the vehicle travelling at 35 kilometers per hour, passes this particular reference level between the times T1 and T2, and thus the triggering device 10 will be activated at the instant where the curve B crosses the portion 14 of the line.

Finally it can be appreciated that after the time T2 the comparator set "Compare 3" becomes operative, and in this case the comparator 8 operates with a reference value X'3 as indicated by the portion 15 of the dotted line. The value X'3 is higher than the value X'1 and the value X'2. It can be seen that the integrated curve A does not pass the line 15 and thus the trigger 10 is not activated.

It will be appreciated that in the embodiment of the invention as described, the accelerometer signal is processed, and is then subjected to a comparison step with a reference or "triggering" level. When the processed signal exceeds the triggering level, a triggering arrangement is activated. However, the triggering level varies with time. This does not mean to say that the triggering level increases with time, since, as has been explained in the example, the triggering level may start at one level, may then fall and may subsequently rise. However, it is to be noted that at different points in time the triggering level is different.

It is to be appreciated that the precise duration of the periods of time T1, T2 can be selected having regard to the particular shape of the deceleration curve for any particular vehicle at any particular speed. Also the actual triggering levels, corresponding to the levels X'1, X'2, X'3 mentioned above may also be selected in dependence upon equivalent factors.

Of course, the chain of separate comparator steps can be extended, with further reference levels, and further time periods applying.

FIG. 4 illustrates a further embodiment of the invention which is very similar to that illustrated in FIG. 2, save that successive integration steps are performed about different reference levels L1, L2, L3. These values are stored in the integration memory 7. This enables further flexibility to be incorporated into the system.

Figure 6:
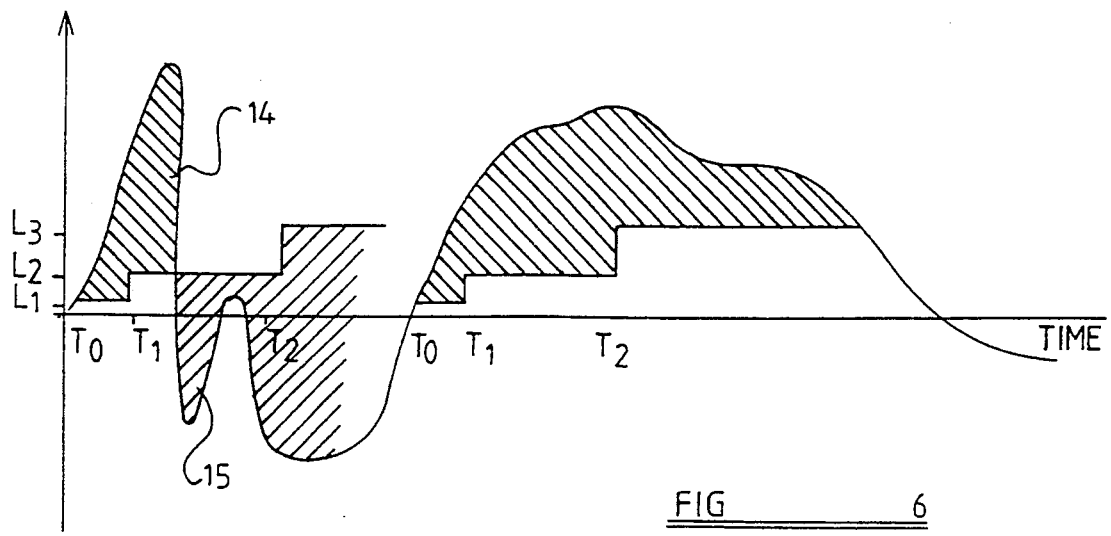
FIG. 6 is a graphical figure to assist in the explanation of FIG. 5.
Figure 7:
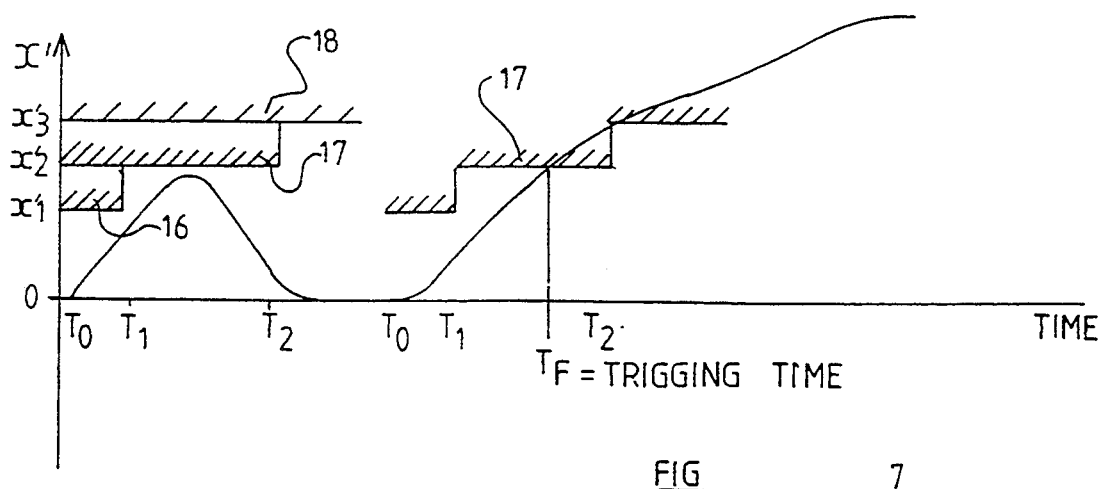
FIG. 7 is a graphical figure related to FIG. 6.

Referring to FIGS. 6 and 7 of the drawings, FIG. 6 illustrates the acceleration signal, developed from the accelerometer as plotted against time.

When the level set by the threshold discriminator 3 is initially passed, time T0 exists, and the integration and comparison procedure commences. In a typical case, the integral is directed in a positive sense, as indicated by the portion of the graph 14, and it can be seen that during an interval of T0 to T1, the integral is processed about a level L1. After the time T1 the integral is integrated about a higher level L2. The integral then goes negative, as indicated at 15.

FIG. 7 illustrates the actual sum of the integral, and also indicates that initially the sum of the integral is compared with a reference level X'1, indicated by the shaded area 16. After time T1 the integral, in this embodiment, is compared with a second reference level X'2 indicated by the shaded area 17. The integral, in this example, then falls and shortly after time T2, the integral again reaches the axis or is equal to nought. Consequently, when this situation exists, the system returns to the position in which the threshold discriminator 3 has not been triggered.

Referring to FIG. 6, it can be seen that the acceleration signal subsequently again passes the threshold, thus instituting a second time T0. The situation here is different, however, since the acceleration rises, and at T1 the level of integration L2 becomes effective and at time T2 the level of the integration L3 becomes effective. However, as can be seen from FIG. 6, the sum of the integral passes into the shaded area 17 corresponding to X'2 at a point $T_F$ which is therefore the triggering time.

It is to be appreciated that if the integration is carried out about different levels, such as the levels L1, L2, L3 it may be sufficient for the sum of the integral to be compared with one fixed reference level, and the desired degree of flexibility may be obtained by selecting the levels L1, L2, L3 appropriately. However, in the embodiment just described, not only are the different integration levels L1, L2, L3 utilised, but also different reference levels X'1, X'2, X'3 are used.

Again this arrangement can be further extended, with further reference levels and further time periods applying.

Whilst the invention has been described with reference to embodiments in which the signal is integrated, it is to be appreciated that alternatively the signal may be differentiated.

Figure 8:
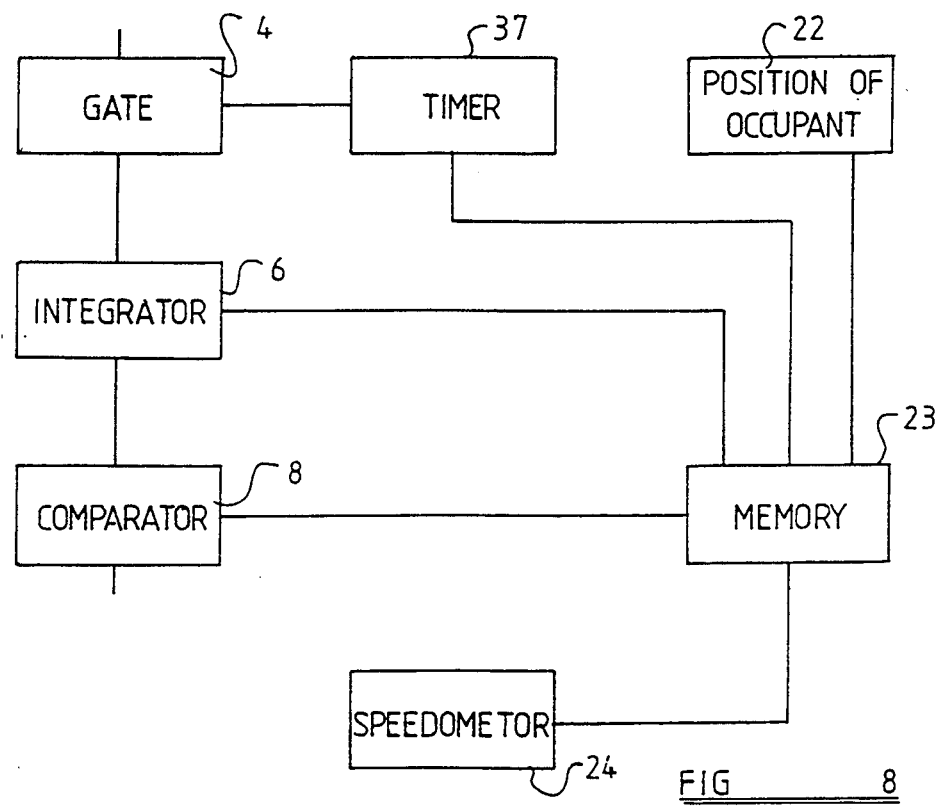
FIG. 8 is a block diagram illustrating another modified embodiment of the invention and FIG. 9 is a further graphical figure corresponding to FIG. 4.

FIG. 8 is a block diagram showing a modified embodiment of the invention. The gate 4, timer 5, integrator 6 and comparator 8 of FIG. 2 are shown in FIG. 8. However, the embodiment of FIG. 8 includes an additional means 22 adapted to determine the position of a person sitting in the vehicle or the condition of a seat belt worn by such a person. It is to be appreciated that if a large person wears a seat belt, the length of seat belt is extended from the retractor when the seat belt is in position is greater than if a slight person is wearing the seat belt. Thus a crude estimate of the weight of the person wearing the seat belt can be obtained merely by noting the length of seat belt that has been extended from the retractor reel. Also, if a person leans forwardly from a rest position, an excess length of seat belt is withdrawn and this can also be observed, providing an indication as to the position of the occupant of the vehicle. A combination of both these features enables not only the approximate weight of the occupant to be determined, but their position, relative to the windscreen of the vehicle, to be determined. It is to be appreciated that these are factors which may influence the instant at which an air bag is to be inflated.

The means to determine the position of the occupant 22 are connected to a memory 23 which has, contained within it, a number of "profiles". Each "profile" consists of a series of values comprising integration level values and comparator level values and values relating to the times at which the specific integration level values and the specific comparator level values are to become operational. Each "profile" will relate to a particular speed for the vehicle, and the weight and position of the occupant of the vehicle. The memory is connected to the speedometer 24 so that the appropriate profile is enabled, depending upon the instantaneous speed of the vehicle.

It is to be appreciated that the embodiment of FIG. 8 will operate in a similar manner to the embodiment of FIG. 2 in that the gate 4 will be opened by the timer 5, and signals from the timer 5 are also fed to the memory 23. Thus at any particular instant during the integration and comparison step which follows the opening of the gate 4 the appropriate integration level signal is fed to the integrator 6 and the appropriate comparator level signal is fed to the comparator 8 from the memory 23.

It is to be appreciated that the "profiles" present in the memory would correspond to the particular vehicle in which the device is fitted.

Figure 9:
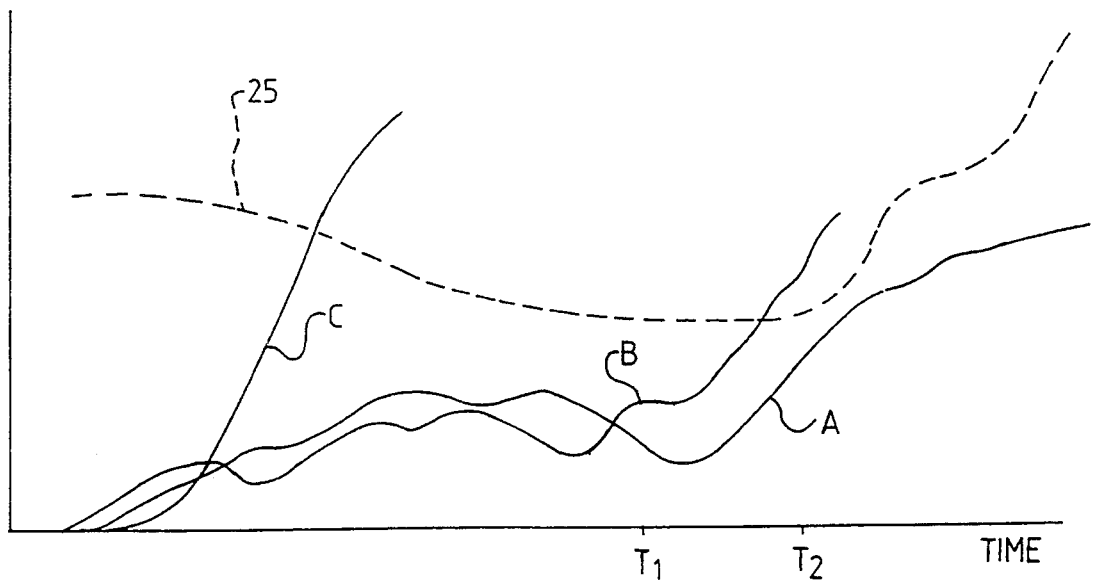

FIG. 9 corresponds to FIG. 4, but instead of using three discrete reference "steps" 13,14,15, a reference level 25 is provided which effectively varies continuously with time in a smooth and substantially "stepless" manner. This is the sort of effect that can be achieved utilising the arrangement of FIG. 8 with an appropriate profile within the memory 23.

Thus it is be appreciated that each profile may be a "step" function, so that the profile consists of a relatively low number of predetermined levels, each of which is operative for a predetermined period of time, or may be a substantially continuously changing function.

I claim:
1. An accelerometer arrangement comprising:
accelerometer means for producing a signal representative of the acceleration or deceleration of a vehicle;
processing means for processing the signal from the accelerometer means by one of integrating and differentiating to produce a processed signal;
comparing means for comparing the processed signal with at least one reference signal including output means for providing an output signal when the reference signal is exceeded by the processed signal;
wherein the processing of the signal from the accelerometer means by the processing means varies in a predetermined manner with time.

2. An accelerometer arrangement according to claim 1, further comprising threshold means for comparing the signal from the accelerometer means with a predetermined threshold value and activating the processing means and comparing means only when the signal from the accelerometer means exceeds the predetermined threshold.

3. An accelerometer arrangement according to claim 1 wherein, in the comparing means, the processed signal is compared with a reference signal that varies in a predetermined manner with time.

4. An accelerometer arrangement according to claim 1 wherein the signal from the accelerometer means is processed by the processing means when it exceeds a predetermined threshold, and wherein the processed signal is compared in the comparing means with an initial reference signal for a predetermined period of time and is then compared with a second reference signal for another predetermined period of time.

5. An accelerometer arrangement according to claim 4 wherein the processed signal is an integrated signal which integrated signal is subsequently compared with a further reference signal during a further predetermined period of time.

6. An accelerometer arrangement according to claim 1 wherein the processing means processes the signal from the accelerometer by integrating about one level for a first period of time, and then about another level for a succeeding period of time.

7. An accelerometer arrangement according to claim 6 wherein the signal from the accelerometer is integrated about another level for a further period of time.

8. An accelerometer arrangement according to claim 1 wherein the output signal is connected to a triggering device for deploying an air bag.

9. An accelerometer arrangement comprising:
accelerometer means for producing a signal representative of the acceleration or deceleration of a vehicle;
processing means for processing the signal from the accelerometer means by one of integrating and differentiating to produce a processed signal;
comparing means for comparing the processed signal with at least one reference signal including output means for providing an output signal when the reference signal is exceeded by the processed signal;
wherein at least one of the reference signal and the processing of the signal from the accelerometer means by the processing means vary in a predetermined manner with time;
wherein, in the comparing means, the processed signal is compared with a reference signal that varies in a predetermined manner with time; and
further comprising memory means for storing reference values wherein the reference signal comprises a signal derived from the memory means, the memory means passing appropriate reference values to the comparing means at appropriate instants in time.

10. An accelerometer arrangement according to claim 9 wherein the memory means stores different integration level values and the memory means passes appropriate values to the processing means for performing integration at appropriate instants in time.

11. An accelerometer arrangement according to claim 10 wherein the memory means stores a plurality of profiles, each associated with at least one predetermined parameter, the arrangement further comprising selecting means for selecting at least one parameter and for passing a selection signal to the memory means to select an appropriate profile, wherein each profile contains at least one of comparator reference signals and integration level values.

12. An accelerometer arrangement according to claim 9 wherein the memory means stores a plurality of profiles, each associated with at least one predetermined parameter, the arrangement further comprising selecting means for selecting at least one parameter and for passing a selection signal to the memory means to select an appropriate profile, wherein each profile contains at least one of comparator reference signals and integration level values.

13. An accelerometer arrangement comprising:
an accelerometer adapted to provide signals representative of the acceleration and deceleration of a vehicle;
a threshold discriminator to determine when said accelerometer signals exceed a threshold and to produce an activation signal;
signal processing means for processing the accelerometer signals responsive to the activation signal, comprising integrating means for integrating the accelerometer signals about an integration level, comparator means for comparing integrated signals with a reference level, and output means for providing an output signal;
memory means for storing at least one of integration level values and comparator reference levels; and
timing means for supplying at least one of predetermined integration level values and comparator reference levels to the integrating means and the comparator means, respectively, at predetermined times after the accelerometer signal exceed said threshold.

14. An accelerometer arrangement according to claim 13 wherein the output signal is connected to a triggering device for deploying an air bag.

15. An accelerometer arrangement comprising:
accelerometer means for producing a signal representative of the acceleration or deceleration of a vehicle;
processing means for processing the signal from the accelerometer means by one of integrating and differentiating to produce a processed signal;
comparing means for comparing the processed signal with at least one reference signal including output means for providing an output signal when the reference signal is exceeded by the processed signal;
wherein at least one of the reference signal and the processing of the signal from the accelerometer means by the processing means vary in a predetermined manner with time;
wherein the signal from the accelerometer means is processed by being integrated about an adjustable integration level which is adjusted in a predetermined manner with time; and
further comprising memory means for storing different integration level values, the memory means passing appropriate values to the processing means for performing integration at appropriate instants in time.

16. An apparatus for triggering the deployment of a vehicle air bag comprising:
an accelerometer for detecting acceleration and deceleration of a vehicle;
a signal processor, connected to receive a signal from the accelerometer, for processing the signal by one of integration and differentiation to produce a processed signal;
a threshold discriminator, connected to receive the processed signal, for comparing the processed signal with at least one reference signal and for producing an initiation signal, wherein the at least one reference signal is a signal which varies in a predetermined manner with time;
a timer, connected to receive the initiation signal and produce at least one control signal responsive thereto;
a gate, connected to receive the processed signal and to receive a control signal, for passing the processed signal responsive to a control signal;
an integration level memory, connected to receive a control signal and synchronize memory access therewith, for storing at least one level signal;
an integrator, connected to receive the processed signal and to selectively access the at least one level signal in the integration level memory, for integrating the processed signal about a level signal from the integration level memory to produce an integrated signal;
a comparator level memory, connected to receive a control signal and synchronize memory access therewith, for storing at least one comparator level value;
a comparator, connected to receive the integrated signal and to access the at least one comparator level value in the comparator level memory, for comparing the integrated signal with a comparator level value to produce a trigger output signal, the comparator being further connected to the gate to selectively transmit a gate close signal thereto; and
a trigger, connected to receive the trigger output signal, for triggering the deployment of the vehicle air bag.

17. An accelerometer arrangement comprising:
accelerometer means for producing a signal representative of the acceleration or deceleration of a vehicle;
processing means for processing the signal from the accelerometer means by one of integrating and differentiating to produce a processed signal;
comparing means for comparing the processed signal with at least one reference signal including output means for providing an output signal when the reference signal is exceeded by the processed signal;
wherein the reference signal varies in a predetermined manner with time.

* * * * *